Patented Oct. 6, 1936

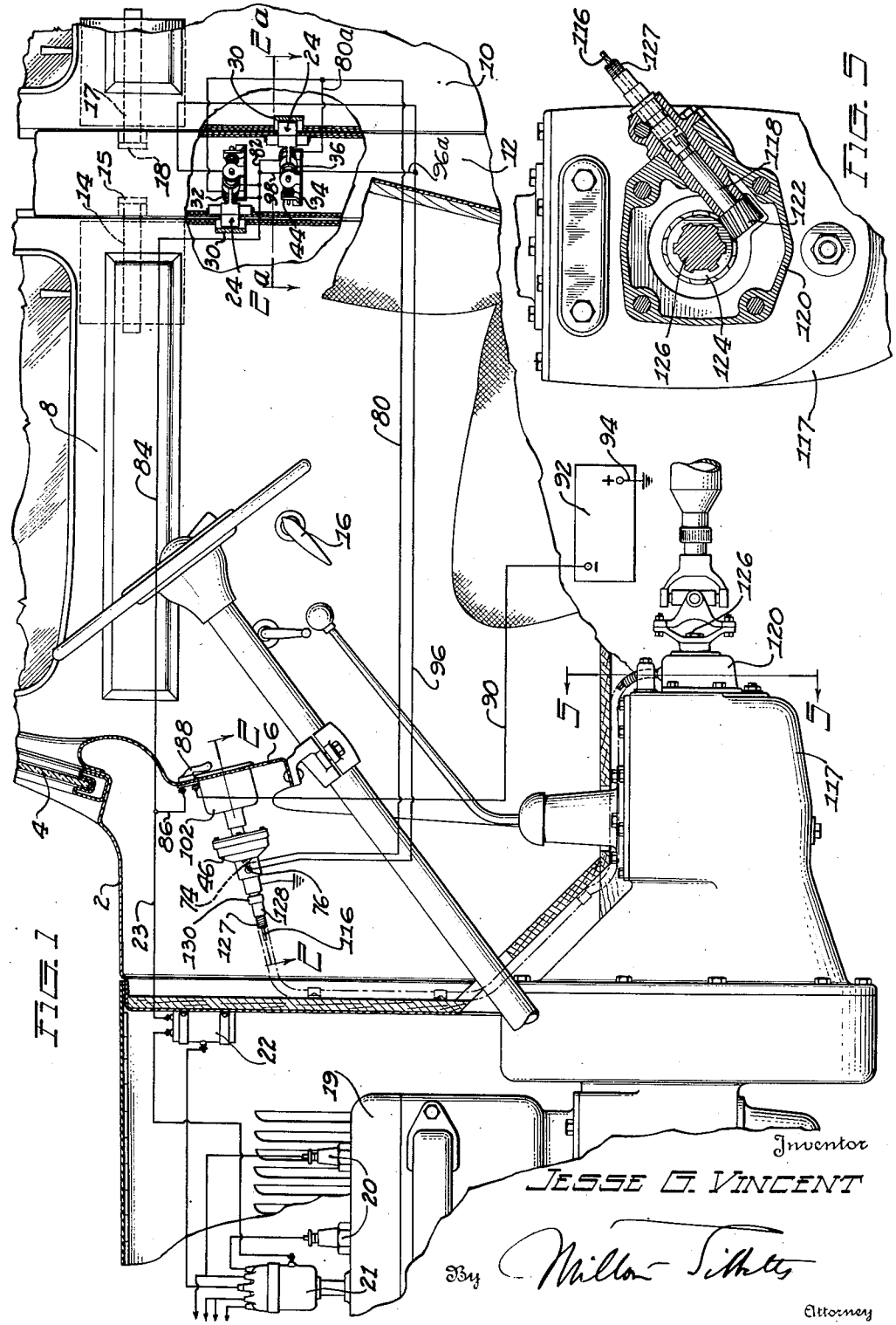

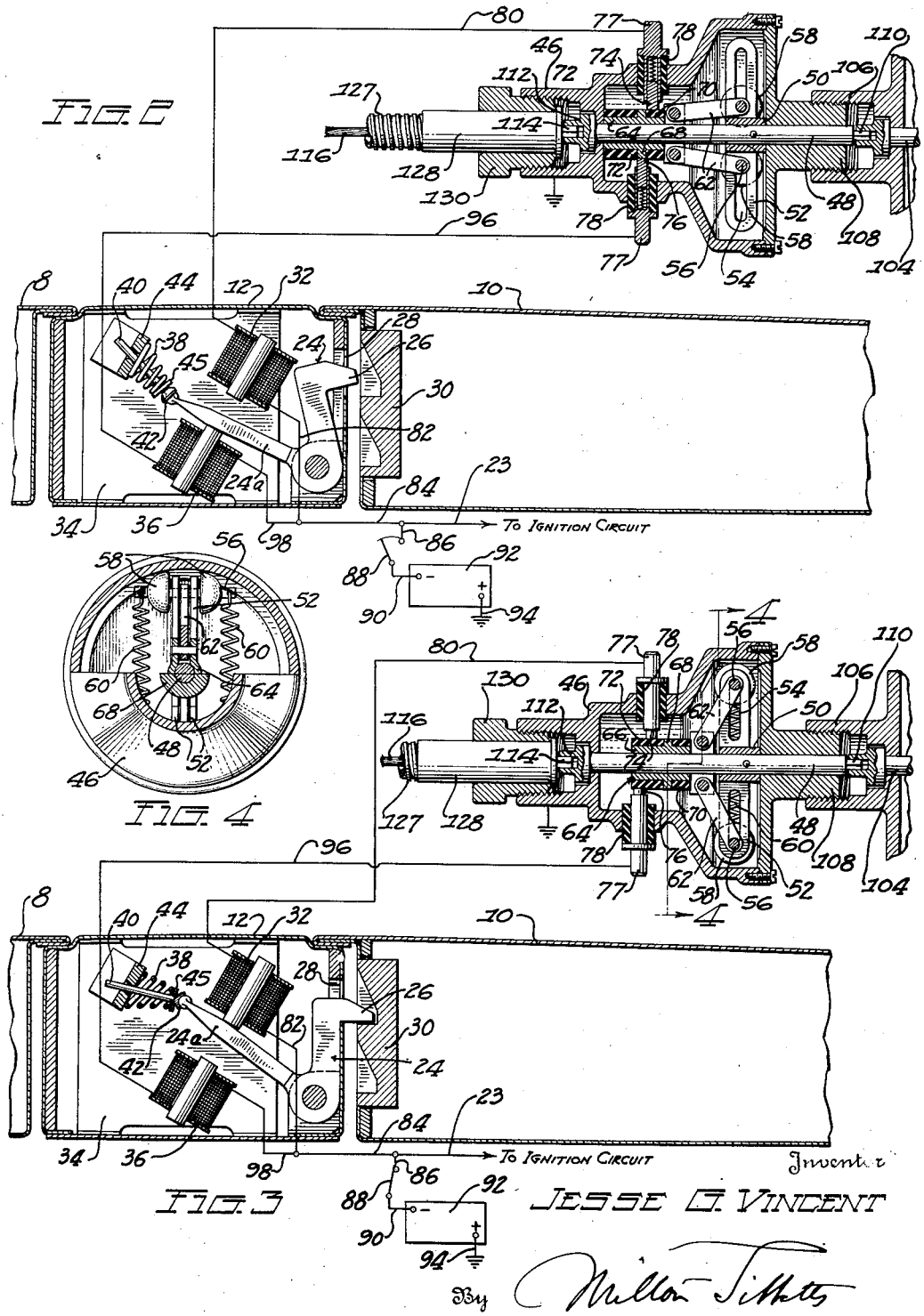

2,056,750

UNITED STATES PATENT OFFICE 2,056,750

MOTOR VEHICLE

Jesse G. Vincent, Grosse Pointe, Mich., assignor to Packard Motor Car Company, Detroit, Mich., a corporation of Michigan Application November 24, 1934, Serial No. 754,617

20 Claims. (Cl. 180—82)

This invention relates to motor vehicles and more particularly to locking devices for locking the doors of automobiles.

One object of the present invention is to produce a novel mechanism particularly adapted for use upon automobiles which is controlled in accordance with the movement of an automobile for locking and unlocking one or more of the doors.

Another object of the invention is to improve the construction and mode of operation of motor vehicle door locking mechanisms of the type in which the locking devices are actuated and controlled to lock one or more of the doors while the vehicle is running and to unlock said doors when the vehicle is at rest and to produce a novel mechanism of this type which is particularly adapted to be applied to automobiles.

Another object of the invention is to produce a novel and improved locking mechanism for use upon automobiles which is preferably operated to lock one or more of the doors of an automobile when the speed rises above a predetermined speed, which will maintain the doors in locked condition while the automobile is running above said speed, which is preferably operated to unlock the doors when the speed is reduced below the predetermined speed and which is maintained in unlocked condition while the automobile is running below said speed or is at rest.

Another object of the invention is to produce a mechanism for use upon automobiles which is controlled in accordance with the movement of an automobile for locking and unlocking one or more of the doors and is constructed and arranged to be applied to automobiles or one of the usual or standard constructions with as few changes as possible in the structure of the parts with which said mechanism is associated.

Certain features of the invention relate to an automobile door locking mechanism of the type in which the locking device for a door is electrically controlled in accordance with the movement of the automobile and another object of the invention is to produce a locking mechanism of this type in which the locking device is operated and controlled with a minimum consumption of electrical current.

Another object of the invention is to produce for use upon automobiles, a mechanism controlled in accordance with the movement of an automobile for locking and unlocking one or more of the doors which is simple in construction and reliable in operation and which is particularly adapted to be applied to automobiles in which the doors are manually operated.

With the above and other objects in view the invention consists in an automobile door locking mechanism embodying the novel and improved features hereinafter described and particularly pointed out in the claims, the advantages of which will be readily understood and appreciated by those skilled in the art.

The invention will be clearly understood from the accompanying drawings illustrating the invention in its preferred form and the following detailed description of the construction therein shown.

In drawings Fig. 1 is a view in longitudinal vertical section of a portion of an automobile body having the invention applied thereto with certain parts broken away, this view showing the electrical circuits diagrammatically.

Fig. 2 is a detail view in section illustrating certain parts of the lock controlling mechanism and taken along the lines 2—2 and 2a—2a of Fig. 1, this view also showing the electrical circuits diagrammatically.

Fig. 3 is a view similar to Fig. 2, illustrating certain of the parts in different positions.

Fig. 4 is a detail sectional view taken substantially on the line 4—4 of Fig. 3 and Fig. 5 is a detail sectional view taken substantially on the line 5—5 of Fig. 1.

The invention is shown in this application as applied to an automobile body having a cowl 2, a windshield 4, an instrument board 6, a forward door 8, hinged at its forward edge, a rear door 10 hinged at its rear edge and a pillar 12, located between said doors. The forward door is provided with the usual latch bolt 14, arranged to engage a striker plate 15 mounted on the pillar 12, said latch bolt being controlled from the inside handle 16 of the usual control lever. The rear door is provided with the usual latch bolt 17 arranged to engage a striker plate 18 mounted on the pillar 12.

The automobile is provided with a motor 19, having the usual ignition mechanism. This mechanism comprises spark plugs 20, a distributor 21, an induction coil 22 and the usual circuit connections between the spark plugs and the distributor and between the distributor and the induction coil. 23 indicates a main primary circuit conductor connecting the induction coil with the usual manually operable ignition switch.

Each of the doors is provided with a locking bolt 24 mounted within the pillar 12. The bolt consists of a two armed lever, one arm of which is formed with a projection 26 arranged to pass through an opening 28 in the sheathing of the door and to engage a striker plate 30 secured to the door. The striker plate preferably is provided with two notches as shown to receive the projection on the locking bolt.

The locking bolt 24 is controlled in accordance with the movement of the automobile. When the automobile is stationary the locking bolt is held in unlocking position as shown in Fig. 2 so that the corresponding door may be freely opened upon retracting the latch bolt. Preferably upon starting the automobile the locking bolt is swung from the position shown in Fig. 2 into the position shown in Fig. 3. During this movement of the bolt the projection 26 is projected through the opening 28 into engagement with the striker plate 30 thereby locking the door. Preferably upon stopping the automobile, the bolt 24 is swung back from the position shown in Fig. 3 into the position shown in Fig. 2 thereby retracting the projection 26 from the striker plate 30 and unlocking the door.

The locking bolt lever 24 is actuated in the manner described by governor controlled mechanism. This mechanism comprises an electromagnet 32 mounted in a casing 34 secured within the pillar 12 and acting to swing the bolt from unlocking to locking position and an electromagnet 36 also mounted in said casing and acting to swing the bolt from locking to unlocking position. One arm 24a of the bolt lever 24 extends between the electromagnets 32 and 36 and constitutes an armature for said magnets.

The locking bolt is held in either locking or unlocking position by means of a coiled spring 38 surrounding a rod 40 having one end thereof pivotally connected at 42 with one arm of the bolt lever and passing through an opening in an angle bracket 44 secured to the casing 34. The spring is interposed between the bracket 44 and a washer 45 mounted on the rod 40 and engaging an enlargement adjacent the end of the rod. The portion of the bracket 44 surrounding the opening through which the rod 40 passes is beveled off as shown in Figs. 2 and 3, thereby forming a connection which enables the rod to slide through the opening and to swing angularly from the position shown in Fig. 2 to that shown in Fig. 3. By the swinging movement of the bolt lever 24 from locking to unlocking position or from unlocking to locking position the center of the pivotal connection 42 is carried from one side to the other of the line connecting the axis of the bolt lever with the pivotal connection between the rod 40 and the angle bracket 44. Thus the spring will hold yieldingly the bolt lever in either position into which it is shifted.

As stated above when the automobile is stationary the locking bolt lever 24 is in unlocking position and if the ignition has been turned off both electromagnets are deenergized. When the ignition is turned on the magnet 36 is energized but this has no effect on the bolt lever 24 since said lever is already in retracted position. Upon starting the automobile and preferable when it has attained a predetermined speed, the magnet 32 is energized and the magnet 36 is deenergized. The attraction of the magnet 32 on the arm 24a of the bolt lever 24 will then swing the lever into locking position. The bolt lever will remain in locking position while the automobile is running at a speed above the predetermined speed. Upon stopping the automobile and preferably when its speed is reduced below the predetermined speed, the magnet 32 is deenergized and the magnet 36 is energized. The attraction of the latter magnet on the arm 24a of the bolt lever will then swing the lever back to unlocking position.

The mechanism for controlling the electromagnets 32 and 36 in the manner described comprises a sliding switch and a governor mechanism for controlling the movements of said switch. In the construction shown, said mechanism is provided with a casing 46 in which is journalled a governor shaft 48 having a sleeve 50 secured thereto and provided with radial arms 52 formed with slots 54. Within these slots are located pins 56 carrying weights 58 which move outwardly under centrifugal action during the rotation of the shaft 48, carrying the pins 56 outwardly therewith. The pins are acted upon by coiled tension springs 60 which move the pins inwardly along the radial arms 52 when the speed of the shaft is reduced, the pins being located at the inner ends of the slots 54 as show in Fig. 2 when the shaft 48 is at rest.

The weights 58 are connected respectively by links 62 with a cylindrical sleeve 64 mounted on the shaft 48 to slide longitudinally thereof and constituting a switch for controlling the electromagnets 32 and 36. The sleeve is provided with a central body 66 made of metal which is a good conductor of electrical current and formed with a collar or flange 68 extending to the outside of the sleeve. The sleeve is also provided with the annular portions 70 and 72 surrounding the central body 66 which are made of insulating material.

Mounted on the casing 46 are two spring pressed contact members or brushes 74 and 76 arranged to engage the peripheral surface of the sleeve 64. These contact members are each carried in a brush holder 77 secured within an insulating bushing 78 mounted in an opening in the casing 46. In order that the electromagnets 32 and 36 may be energized and deenergized in the proper order with relation to each other by the movements of the switch 64 longitudinally of the shaft 48, the contacts 74 and 76 are offset with relation to each other longitudinally of the shaft as clearly shown in Figs. 2 and 3. The shaft 48 is connected with and driven by a rotary element of the vehicle which is stationary when the vehicle is stationary and rotates at a speed proportional to the speed of the vehicle when the vehicle is running.

Figs. 2 and 3 show diagrammatically the circuit connections respectively between the contacts 74 and 76 and the electromagnets 32 and 36. As shown in these figures the holder for the contact 74 is connected by means of a conductor 80 with the electromagnet 32. The electromagnet 32 is connected by a conductor 82 with a conductor 84 which, in turn, is conducted by a conductor 86 with one terminal of a manually operable switch 88. The other terminal of this switch is connected by a conductor 90 with one terminal of a battery 92 the other terminal of which is grounded through a conductor 94. The holder for the contact 76 is connected by a conductor 96 with the electromagnet 36 and the electromagnet is connected by a conductor 98 with the conductor 84. The conductors 84 and 86, at their junction, are connected with the conductor 23 of the ignition circuit. The shaft 48 is grounded through the frame of the vehicle.

Fig. 2 shows the position of the parts of the lock bolt mechanism and the controlling means therefor when the automobile is at rest and the engine has been stopped. It will be noted that, as shown in this figure, the manually operable switch 88 is open and that the circuits respectively for the ignition and for the electromagnets 32 and 36 are all broken. This constitutes a safety feature of the present construction, the opening of the switch 88 in stopping the engine insuring the breaking of the several circuits to guard against short circuits which might result in fire.

When the shaft 48 is at rest the switch 64 occupies the left hand position on the shaft shown in Fig. 2 in engagement with a stop formed on the casing 46, the contact 76 then being in engagement with the collar 68 on the switch.

When the driver is about to start the automobile, he closes the manually operable switch 88. This closes the ignition circuit and also closes the circuit of the electromagnet 36. The circuit for the electromagnet 32, however, remains broken at the switch 64. The energizing of the electromagnet 36 causes the same to exert an attracting force on the arm 24a of the lock bolt lever 24. This lever, however, is then in locking position as shown in Fig. 2 so that no change occurs in the position of the lever. As the automobile is started, the shaft 48 starts to rotate and the weights 58 carry the pins outwardly along the arms 52 and when the automobile has attained a predetermined speed and said shaft has attained a corresponding predetermined speed, the weights and pins occupy positions at the outer ends of the arms as shown in Fig. 3.

The outward movement of the weights 58 and pins 56 shifts the switch 64 longitudinally of the shaft 48 to the right substantially into the position shown in Fig. 3. During this movement of the switch 64, the collar 68 is engaged with the contact 74 and said collar is disengaged from the contact 76 while it is still engaged with the contact 74 thereby energizing the magnet 32 while the magnet 36 is deenergized. The energization of the magnet 32 while the magnet 36 is deenergized will cause the magnet 32 then to attract the arm 24a of the lock bolt lever 24 and the lever will thus be swung into the locking position shown in Fig. 3. When the switch 64 reaches the position shown in Fig. 3 both the circuits for the electromagnets 32 and 36 are broken, this action resulting in economy in the consumption of electrical current.

The lock bolt lever will remain in locking position as long as the automobile is running above the predetermined speed. Upon stopping the automobile, as the speed of the shaft 48 is reduced below that required to overcome the tension of the springs 60, the weights 58 and pins 56 are moved inwardly along the arms 52 until, when the shaft reaches a predetermined speed the parts are brought by said springs substantially into the position shown in Fig. 2. This occurs, of course, when the vehicle reaches a predetermined speed corresponding with the speed of the shaft. The inward movement of the weights 58 and the pins 56 will shift the switch 64 to the left from the position shown in Fig. 3 into the position shown in Fig. 2. During this movement of the switch the collar 68 is first engaged with the contact 74 thereby energizing the magnet 32. This energization of the magnet 32, however, will not affect the lock bolt lever 24 since said lever is already in locking position. The collar 68 is then engaged with the contact 76 and while still in engagement with said contact is disengaged from the contact 74, the collar remaining in engagement with the contact 76 when the sliding movement of the switch is stopped. The magnet 36 will thus be energized while the magnet 32 is deenergized and the lock bolt lever will be swung from locking position to unlocking position and will remain in unlocking position when the vehicle is brought to rest. In turning off the motor after the vehicle is brought to rest, the driver opens the switch 88.

In the present construction the governor casing 46 is attached to the casing of the speedometer and the shaft 48 is interposed between two of the rotary shafts of the speedometer mechanism. This has been found to be a particularly simple and convenient construction for securing the desired results.

As shown in the drawings, the speedometer comprises a casing indicated at 102 secured to the instrument board 6 and having journalled therein a rotary shaft 104 projecting forwardly within an extension 106 on a speedometer casing. The governor casing 46 is provided with an extension 108 which is threaded within the extension 106 on the speedometer casing to support the governor casing. The governor shaft 48 is provided at its end adjacent the shaft 104 with a projection 110 polygonal in cross section, which is received in a similarly shaped socket in the adjacent end of the shaft 104 to connect rotatably said shafts. The opposite end of the governor shaft is provided with a socket 112 also polyonal in cross section in which is received a similarly shaped end portion 114 formed on the flexible speedometer shaft 116 to connect rotatably said shafts.

The flexible shaft 116 is driven from the driven shaft of the transmission mechanism. This shaft extends from the casing 46 downwardly along the dash and beneath the floor boards to a point adjacent the rear end of the transmission housing 117 and is connected at its lower end by a suitable coupling with a shaft 118 journalled in a bearing member secured in a casing 120 attached to the rear end of the transmission housing. To the lower end of the shaft 118 is secured a gear 122 meshing with a gear 124 secured on the driven shaft 126 of the transmission.

The flexible shaft 116 is surrounded by the usual flexible tube 128 secured at its upper end to the casing 46 and at its lower end to one of the members attached to the casing 120. To the upper end of the tube is attached a thimble 128 and the tube is secured to the casing 46 by means of a sleeve 130 surrounding the thimble and threaded into said casing.

Locking bolts such as the locking bolt 24 may be applied to any number of doors of a vehicle. Fig. 1 of the drawings shows a locking bolt applied to each of the doors 8 and 12 and each operated by magnets 32 and 36. This figure shows the circuit connections for the two sets of magnets. In the circuit diagram shown in this figure the conductor 80 is connected with the lower magnet by a conductor 80a and the conductor 96 is connected by the lower magnet 36 by a conductor 96a. Otherwise the circuit connections for each set of magnets are the same as shown in Figures 2 and 3.

The springs 60 which control the movements of the weights 58 under centrifugal action may be selected to cause the locking device for the doors to be thrown into operation when the vehicle reaches any desired predetermined speed. Thus these springs may be of such strength that the locking device will be thrown into operation upon starting the vehicle when the vehicle reaches a speed of three miles per hour, for example. It may be desirable, however, to employ springs to cause the locking devices to be held out of operation until the vehicle reaches a much higher predetermined speed.

In the event that the driver, in stopping the automobile, turns off the ignition thereby breaking the circuits for both electromagnets for the locking device for each door before the automobile slows down to the predetermined speed at which the magnet 36 for said locking device is energized while the corresponding magnet 32 is deenergized, the locking bolt will remain in locking position when the automobile is brought to rest. The bolt, however, may be then thrown into unlocking position by operating the switch 88 to close the ignition circuit and the circuit for magnet 36. The switch may then be moved back to its former position to break the ignition circuit and the circuit for magnet 36 leaving the locking bolt in unlocking position.

The present locking mechanism may be applied to an automobile of one of the usual or standard constructions without making any considerable changes in the structure of the parts with which said mechanism is associated. The speedometer mechanism may be of a standard construction. In such a construction the forward end of the shaft 104 is provided with a socket shaped to receive the end 114 of the flexible shaft 116. The sleeve 130 is adapted to be threaded into the extension 106 on the speedometer casing to secure the end of the tube 128 to the casing. Thus the application of the governor mechanism to the speedometer mechanism involves no change in the structure of the speedometer mechanism. The circuits for the electromagnets 32 and 36 may be connected with the ignition circuit without making any substantial changes in said circuit.

The application of the locking devices and the electromagnets for actuating the same to the pillar 12 and the doors involve very little change in the door and pillar structure from the ordinary hollow sheet metal constructions.

It is to be understood that the invention is not limited to the particular construction and arrangement of parts of the illustrated embodiment of the invention but that the invention may be embodied in other forms within the scope of the claims.

Having explained the nature and object of the invention and having specifically described a construction embodying the invention in its preferred form what is claimed is:

1. A construction for motor vehicles comprising an internal combustion engine, ignition mechanism therefor, a door, a locking device for the door, electrical means for actuating the locking device including one or more circuits, means responsive to vehicle movement for controlling said electrical means, and means for breaking said circuits upon turning off the ignition.

2. A construction for motor vehicles comprising an internal combustion engine, ignition mechanism therefor, a door, a locking device for the door and electrical means controlled by the running of the vehicle for actuating the locking device including a circuit and means for closing a break in said circuit upon turning on the ignition and for opening said break upon turning off the ignition.

3. A construction for motor vehicles comprising a door, a locking device for the door, an electromagnet for moving the locking device into locking position, an electromagnet for moving the locking device into unlocking position and speed controlled means for causing the energization and deenergization of said magnets.

4. A construction for motor vehicles comprising a door, a locking device for the door, electrical mechanism for controlling the locking device including two electromagnets and speed controlled means for causing the deenergization of each of said magnets in a predetermined relation to the energization of the other magnet.

5. A construction for motor vehicles comprising a door, a locking device for the door, an electromagnet for moving the locking device into locking position, an electromagnet for moving the locking device into unlocking position and means controlled by the movement of the vehicle for causing the energization of the first magnet while the second magnet is deenergized to actuate the locking device to lock the door upon starting the vehicle and for causing the energization of the second magnet while the first magnet is deenergized to actuate the locking device to unlock the door upon stopping the vehicle.

6. A construction for motor vehicles comprising a door, a locking device for the door, an electromagnet for moving the locking device into locking position, an electromagnet for moving the locking device into unlocking position, circuits for said magnets, and means including a governor for making the circuit of the first magnet and breaking the circuit of the second magnet to throw the locking device into locking position upon starting the vehicle and for making the circuit of the second magnet and breaking the circuit of the first magnet to throw the locking device into unlocking position upon stopping the vehicle and for causing both circuits to be broken during the running of the vehicle above a predetermined speed.

7. A construction for motor vehicles comprising a door, a locking device for the door, electrical mechanism controlled in accordance with the running of the vehicle for moving said locking device including one or more circuits and means including a governor causing said circuits to be broken during the running of the vehicle above a predetermined speed.

8. A construction for motor vehicles comprising a door, a locking device for the door and electrically controlled mechanism including a governor for moving the locking device into locking position upon starting the vehicle and for moving the locking device into unlocking position upon stopping the vehicle including one or more circuits and means for causing all of said circuits to be broken when the vehicle is running above a predetemined speed.

9. A construction for motor vehicles comprising a door, a locking device for the door, governor mechanism for controlling the locking device including a governor shaft, speedometer mechanism including a speedometer shaft and a connection between the speedometer shaft and the governor shaft for actuating the governor shaft.

10. A construction for motor vehicles comprising a door, a locking device for the door, speedometer mechanism having two shafts and governor mechanism for controlling the locking device including a governor shaft interposed between and connected to said speedometer shafts.

11. A construction for motor vehicles comprising a door, a locking device for the door, speedometer mechanism including a casing, a shaft rotatably mounted in said casing, governor mechanism for controlling the locking device including a casing secured to and supported by the speedometer casing and a governor shaft rotatably mounted in the latter casing and connected with the speedometer shaft.

12. A construction for motor vehicles comprising a door, a locking device for the door, electrical mechanism for controlling the locking device, governor mechanism for controlling said electrical mechanism, including a rotary member driven at a speed corresponding with the vehicle movement, one or more centrifugally movable weights connected with said member for rotation therewith, a movable switch controlled by said weights and contacts engaged and disengaged in a predetermined order by the movements of said switch to throw said locking device into and out of locking position in accordance with movement of the vehicle.

13. A construction for motor vehicles comprising a door, a locking device for the door, an electromagnet for moving the locking device into locking position, an electromagnet for moving the locking device into unlocking position, circuits for said magnets, governor mechanism for controlling the energization and deenergization of said magnets including a rotary member driven at a speed corresponding with the movement of the vehicle, a centrifugally movable weight connected with said member for rotation therewith and a switch mechanism controlled by said weight for making and breaking the circuits of said magnets to throw the locking device into and out of operation in accordance with the movement of the vehicle.

14. A construction for motor vehicles comprising a door, a locking device for the door, electrical mechanism for controlling the locking device, governor mechanism for controlling said electrical mechanism including a rotary member driven at a speed corresponding to vehicle movement, a centrifugally movable weight connected with said member for rotation therewith, a switch slidable axially of said rotary member and connected with said weight and contacts engaged and disengaged in a predetermined order by the movement of said switch in each direction to throw said locking device into and out of locking position in accordance with movement of the vehicle.

15. A construction for motor vehicles comprising a door, a locking device for the door including a rotary shaft, a centrifugally movable weight connected for rotation with said shaft at a speed corresponding to vehicle movement, a switch member formed with a cylindrical peripheral surface and rotating with and slidable axially on said shaft and having a contact portion and one or more insulating portions extending about the periphery thereof, means for connecting the switch member with said weight and contacts offset axially of the shaft and engaging the periphery of said switch and engaged with and disengaged from said contact portion of the switch in a predetermined order by the movement of the switch axially of the shaft to throw said locking device into and out of locking position with the door in accordance with movement of the vehicle.

16. A construction for motor vehicles comprising an internal combustion engine, an ignition circuit therefor, a door, a locking device for the door, electrical mechanism for actuating the locking device including one or more circuits, means responsive to speed for controlling said mechanism and common means for controlling the latter circuits and the ignition circuit.

17. A construction for motor vehicles comprising a door, a locking device for the door, an electromagnet for causing the locking device to be moved into locking position, an electromagnet for causing the locking device to be moved into unlocking position, a reciprocatory sliding switch for causing the energization and deenergization of said magnets in a predetermined order, and means rotated in accordance with vehicle movement for actuating said sliding switch.

18. A construction for motor vehicles comprising a door, a locking device for the door, an electromagnet for causing the locking device to be moved into locking position, an electromagnet for causing the locking device to be moved into unlocking position, a reciprocatory switch member, contacts engaging said switch member and offset in the direction of movement thereof, conductors for connecting said circuits respectively with said magnets, and means rotated in accordance with vehicle movement for actuating said switch member.

19. A construction for motor vehicles comprising an internal combustion engine, ignition mechanism therefor including an ignition circuit, a door, a locking device for the door, electrical mechanism for controlling the locking device including one or more circuits, speed responsive means for controlling said mechanism, and manually operable means for breaking the latter circuits by breaking the ignition circuit.

20. A construction for motor vehicles comprising an internal combustion engine, ignition mechanism therefor including an ignition circuit, a door, a locking device for the door, electrical mechanism for controlling the locking device including one or more circuits, speed responsive means controlling said mechanism, and a manually operable switch for breaking the circuits of said electrical mechanism simultaneously with the breaking of the ignition circuit.

JESSE G. VINCENT.